United States Patent
Choi

(10) Patent No.: US 10,432,119 B2
(45) Date of Patent: Oct. 1, 2019

(54) GAS TURBINE SYSTEM AND METHOD OF CONTROLLING THE SAME

(71) Applicant: DOOSAN HEAVY INDUSTRIES & CONSTRUCTION CO., LTD., Changwon-si, Gyeongsangnam-do (KR)

(72) Inventor: Byung Hee Choi, Yongin-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 15/953,407

(22) Filed: Apr. 14, 2018

(65) Prior Publication Data

US 2018/0316293 A1 Nov. 1, 2018

(30) Foreign Application Priority Data

Apr. 26, 2017 (KR) .......................... 10-2017-0053795

(51) Int. Cl.
*H02P 9/04* (2006.01)
*H02P 101/25* (2016.01)
(Continued)

(52) U.S. Cl.
CPC .................. *H02P 9/04* (2013.01); *F02C 9/28* (2013.01); *F02C 3/04* (2013.01);
(Continued)

(58) Field of Classification Search
USPC ................ 290/40 A, 40 R; 60/773; 700/287; 701/100
See application file for complete search history.

(56) References Cited

U.S. PATENT DOCUMENTS 3,357,177 A * 12/1967 Cornett ..................... F02C 3/30
60/39.281
3,488,948 A * 1/1970 Rose ......................... F02C 9/32
137/805
(Continued)

FOREIGN PATENT DOCUMENTS

EP 0858153 A1 8/1998
EP 3054129 A1 8/2016
(Continued)

OTHER PUBLICATIONS

An European Search Report dated Sep. 6, 2018 in connection with European Patent Application No. 18168890.4 which corresponds to the above-referenced U.S. application.
(Continued)

*Primary Examiner* — Pedro J Cuevas
(74) *Attorney, Agent, or Firm* — Invenstone Patent, LLC

(57) ABSTRACT

A gas turbine control device for a gas turbine system includes a sensing unit for measuring the rotor speed and the output of the power generator; a speed regulation rate setting unit for calculating an actual speed regulation rate based on the measured rotor speed and the measured output of the power generator, and for setting a reference speed regulation rate based on the actual speed regulation rate and the target speed regulation rate; and a fuel amount control unit for controlling an amount of fuel supplied to the combustor based on the set reference speed regulation rate. Stable system operation is secured by a method of controlling the gas turbine system to satisfy a target speed regulation rate if additional power should be supplied due to sudden load fluctuations or a failure at another power plant.

17 Claims, 4 Drawing Sheets

US 10,432,119 B2
Page 2

(51) Int. Cl.
*F02C 9/28* (2006.01)
*F02C 3/04* (2006.01)

(52) U.S. Cl.
CPC .. *F05D 2220/764* (2013.01); *F05D 2270/024* (2013.01); *F05D 2270/05* (2013.01); *F05D 2270/061* (2013.01); *F05D 2270/304* (2013.01); *F05D 2270/335* (2013.01); *H02P 2101/25* (2015.01)

(56) References Cited

U.S. PATENT DOCUMENTS

| | | | | |
|---|---|---|---|---|
| 3,892,975 A * | 7/1975 | Yannone | F02C 9/26 | 290/40 R |
| 3,911,285 A * | 10/1975 | Yannone | F02C 9/32 | 290/40 R |
| 3,924,141 A * | 12/1975 | Yannone | F02C 7/26 | 290/38 R |
| 3,943,373 A * | 3/1976 | Yannone | F02C 7/26 | 290/40 R |
| 4,019,315 A * | 4/1977 | Yannone | F02C 7/26 | 290/40 A |
| 4,051,669 A * | 10/1977 | Yannone | F02C 9/32 | 60/39.091 |
| 4,204,401 A * | 5/1980 | Earnest | F01K 23/10 | 60/39.181 |
| 4,208,591 A * | 6/1980 | Yannone | F02C 9/28 | 290/40 R |
| 4,242,592 A * | 12/1980 | Yannone | F02C 9/56 | 290/40 R |
| 4,271,664 A * | 6/1981 | Earnest | F01K 23/10 | 60/39.181 |
| 4,314,441 A * | 2/1982 | Yannone | F02C 9/28 | 60/39.281 |
| 4,445,180 A * | 4/1984 | Davis | F01D 17/24 | 290/40 R |
| 5,465,570 A * | 11/1995 | Szillat | F02C 7/26 | 60/39.281 |
| 5,916,126 A * | 6/1999 | Szillat | F02C 7/26 | 60/778 |
| 7,503,175 B2 * | 3/2009 | Isogai | F02B 37/005 | 60/605.2 |
| 7,805,207 B2 * | 9/2010 | El Rifai | G05B 13/02 | 700/42 |
| 8,126,629 B2 * | 2/2012 | Buchalter | F23N 1/002 | 123/439 |
| 8,849,542 B2 * | 9/2014 | Meisner | F02C 9/00 | 700/28 |
| 9,334,753 B2 * | 5/2016 | Race | F01D 5/081 | |
| 9,404,426 B2 * | 8/2016 | Wichmann | F02C 9/50 | |
| 9,926,852 B2 * | 3/2018 | Tiwari | F02C 9/00 | |
| 9,932,907 B2 * | 4/2018 | Tiwari | F02C 6/18 | |
| 9,945,264 B2 * | 4/2018 | Wichmann | F01K 23/101 | |
| 9,957,843 B2 * | 5/2018 | Wichmann | F01K 13/02 | |
| 9,960,598 B2 * | 5/2018 | Asati | H02J 3/14 | |
| 10,094,297 B2 * | 10/2018 | Kusumi | F02C 6/00 | |
| 10,287,988 B2 * | 5/2019 | Asati | F02C 9/28 | |
| 2004/0237537 A1 * | 12/2004 | McKelvey | F02C 7/26 | 60/773 |
| 2006/0162333 A1 * | 7/2006 | Isogai | F02B 37/005 | 60/601 |
| 2013/0038072 A1 * | 2/2013 | Miller | F02C 7/057 | 290/40 B |
| 2013/0257054 A1 * | 10/2013 | Ouellet | F01D 15/10 | 290/52 |
| 2014/0005909 A1 * | 1/2014 | Meisner | F02C 9/00 | 701/100 |
| 2014/0060065 A1 | 3/2014 | Sweet et al. | | |
| 2014/0150438 A1 * | 6/2014 | Ellis | F02C 9/26 | 60/772 |
| 2014/0260293 A1 | 9/2014 | Chen et al. | | |
| 2015/0184549 A1 * | 7/2015 | Pamujula | F01K 23/101 | 700/287 |
| 2015/0184550 A1 * | 7/2015 | Wichmann | G05B 13/04 | 700/287 |
| 2015/0185716 A1 * | 7/2015 | Wichmann | F01K 23/101 | 700/287 |
| 2016/0146118 A1 * | 5/2016 | Wichmann | F02C 9/50 | 701/100 |
| 2016/0147204 A1 * | 5/2016 | Wichmann | G05B 13/042 | 700/287 |
| 2016/0258361 A1 * | 9/2016 | Tiwari | F02C 9/00 | |
| 2016/0258363 A1 * | 9/2016 | Tiwari | F02C 6/18 | |
| 2016/0261115 A1 * | 9/2016 | Asati | H02J 3/14 | |
| 2016/0281607 A1 * | 9/2016 | Asati | F02C 9/28 | |
| 2017/0145925 A1 * | 5/2017 | Kusumi | F02C 6/00 | |
| 2017/0254282 A1 * | 9/2017 | Sonoda | F02C 9/20 | |
| 2017/0364043 A1 * | 12/2017 | Ganti | G05B 13/048 | |
| 2018/0306124 A1 * | 10/2018 | Choi | F02C 9/20 | |

FOREIGN PATENT DOCUMENTS

| | | |
|---|---|---|
| GB | 2019618 A | 10/1979 |
| JP | 2016-153645 A | 8/2016 |

OTHER PUBLICATIONS

Y.O.Shin, J.A.Kim, "Controller Tuning of a Gas Turbine Generator to Improve Speed Regulation", Korea Electric Power Research Institute, Abstract.

A Japanese Notification of Reasons for Refusal dated Feb. 28, 2019 in connection with Japanese Patent Application No. 2018-044931 which corresponds to the above-referenced U.S. application.

* cited by examiner

[FIG. 1]
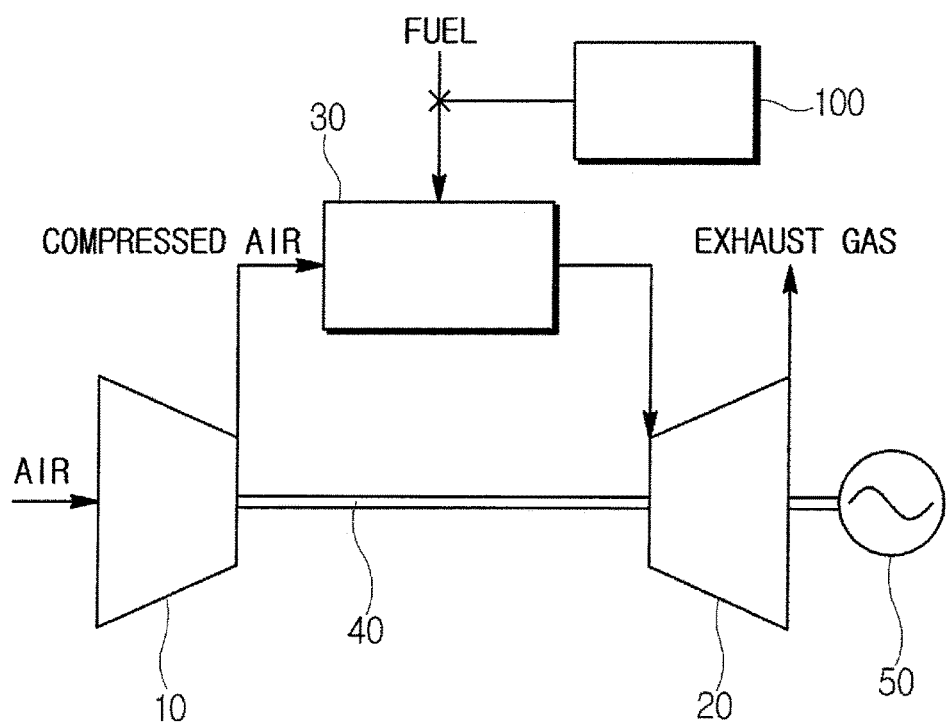

[FIG. 2]
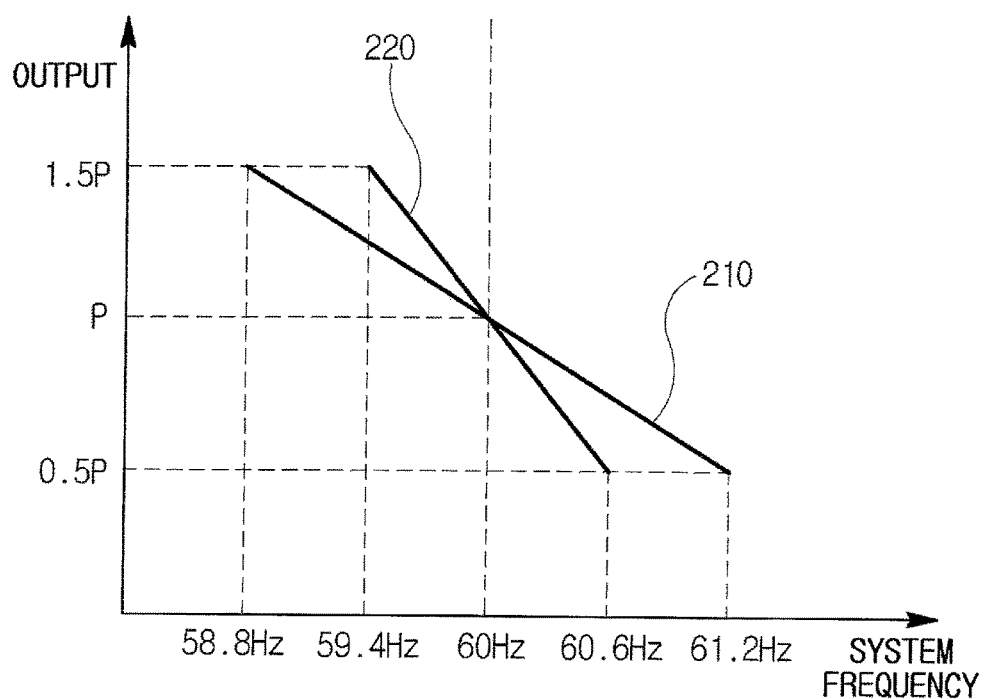

[FIG. 3]
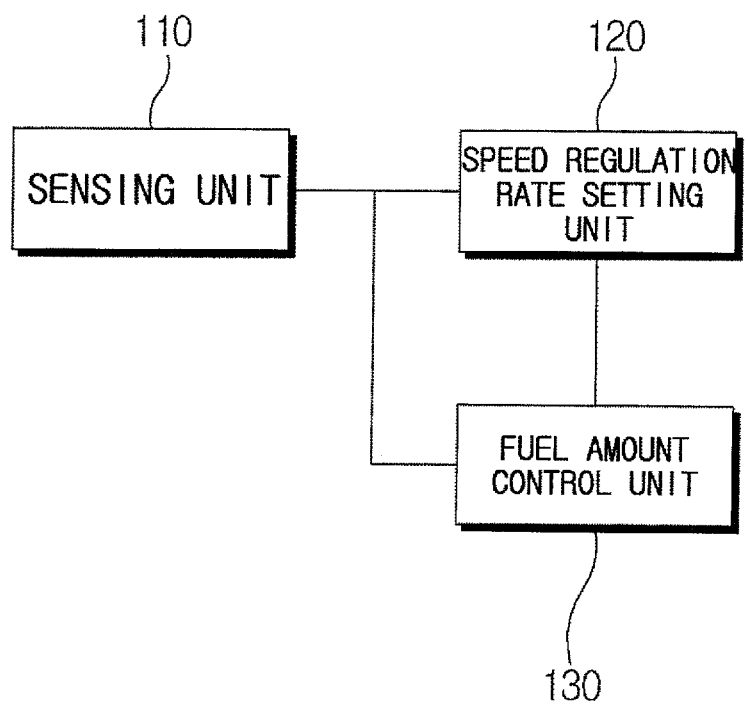

[FIG. 4]
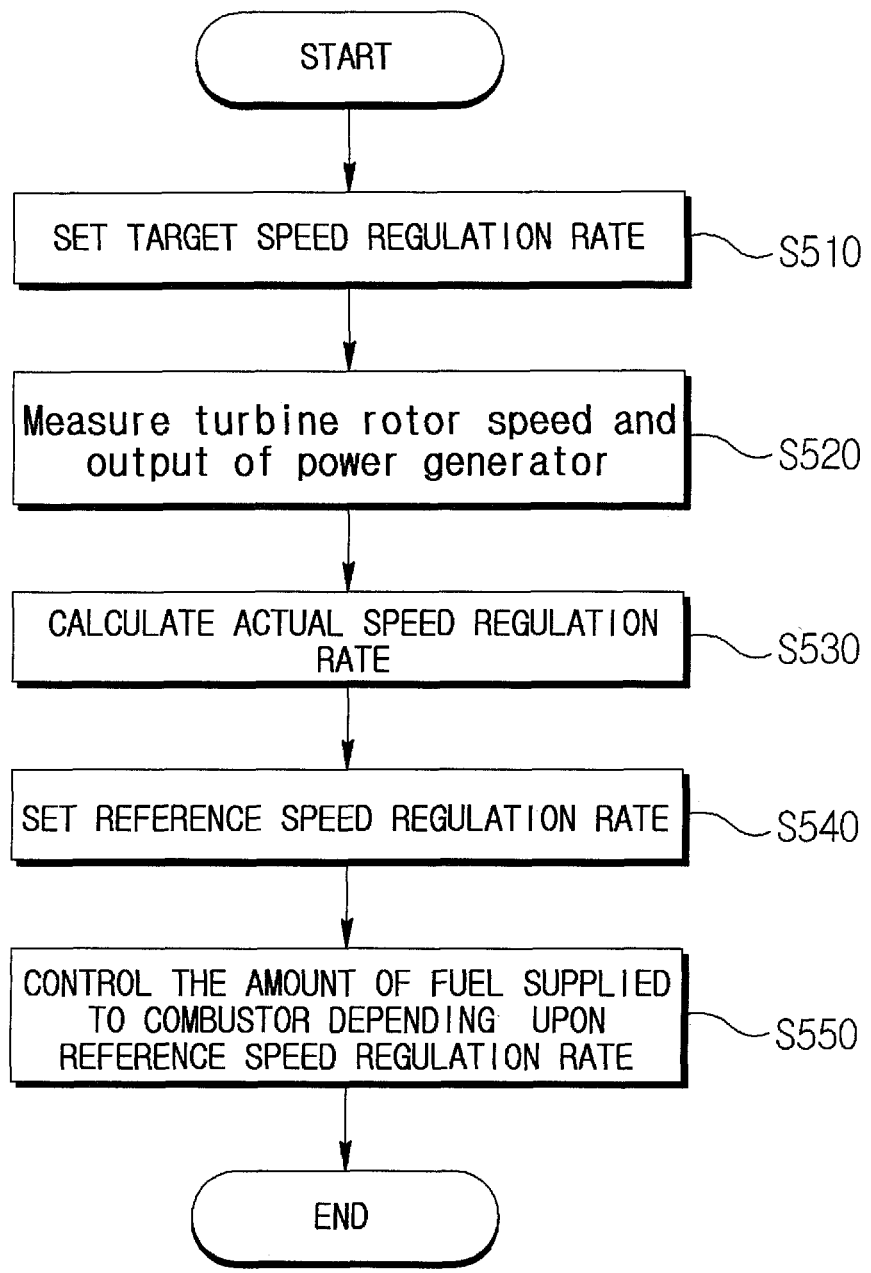

US 10,432,119 B2

GAS TURBINE SYSTEM AND METHOD OF CONTROLLING THE SAME

CROSS-REFERENCE(S) TO RELATED APPLICATIONS

This application claims priority to Korean Patent Application No. 10-2017-0053795, filed on Apr. 26, 2017, the invention of which is incorporated herein by reference in its entirety.

BACKGROUND OF THE INVENTION

Field of the Invention

The present invention relates to a gas turbine system and a method of controlling the same, and more particularly, to a gas turbine system and a method of controlling the same that the gas turbine system can regulate a reference speed regulation rate that references when a fuel amount control unit controls the amount of fuel supplied to a combustor in order to meet a target speed regulation rate.

Description of the Related Art

Generally, a system or an apparatus having a turbine such as a gas turbine or a steam turbine, as a power generation apparatus converting thermal energy of gas or fluid into a rotation force that is mechanical energy, includes a rotor axially rotated by gas or fluid and a stator supporting and surrounding the rotor.

In simply explaining the configuration of the gas turbine used in a power plant for generating electricity, it can include a compressor supplying high-pressure air that compresses air to a combustor, the combustor for generating combustion gas, and a turbine operated by the combustion gas discharged from the combustor.

Generally, the compressor of the gas turbine is integrally coupled with the shaft of the turbine to axially rotate like the turbine, and sucks and compresses external air while performing the axial rotation. The compressed air is supplied to the combustor, and the combustor generates high-temperature, high-pressure combustion gas by supplying fuel to the compressed air to combust the mixture, and supplies it to the turbine.

The high-temperature, high-pressure combustion gas supplied to the turbine drives a rotary wing of the turbine to rotate the rotor of the turbine.

In the power system supplying electricity, for stable operation of the entire power system, the system frequency needs to be continuously maintained at the rated frequency (60 Hz in Korea). A plurality of power plants are generally connected to the system to share the power, and if the supply and the load match, the system frequency stabilizes at the rated frequency. However, if one of more power plants fail to supply power due to an event such as a breakdown, the supply becomes insufficient and thereby the system frequency is lowered. In this case, other power plants additionally supply the lacking power to stabilize the system frequency. At this time, there is the concept of a speed regulation rate as an indicator representing how much power each power plant additionally supplies. The speed regulation rate represents the ratio of the rate of change of frequency to the rate of change of output of power generator as a percentage.

However, it is expected that the power plant will additionally supply the power depending on the speed regulation rate, but the actually measured speed regulation rate cannot reach the target speed regulation rate due to a time difference in the control response time and errors in the control logic, etc. In this case, the power to be additionally supplied does not meet the requirements, and thereby there is the problem in maintaining the system frequency at the rated frequency.

SUMMARY OF THE INVENTION

The object of the present invention is to provide a gas turbine system and a method of controlling the same in which a fuel amount control unit can control a reference speed regulation rate based on the measured actual speed regulation rate, in order to meet the target speed regulation rate.

In accordance with one aspect of the present invention, a gas turbine control device for a gas turbine system may comprise a compressor sucking and compressing external air; a combustor combusting fuel and the air compressed in the compressor to generate a high-temperature, high-pressure combustion gas; a turbine having a rotor rotated by the combustion gas, the rotor having a rotor speed proportional to a system frequency; and a power generator driven by the rotation of the rotor, an output of the power generator being adjusted depending on a target speed regulation rate in order to restore the system frequency to a rated frequency. The device may include a sensing unit for measuring the rotor speed and the output of the power generator; a speed regulation rate setting unit for calculating an actual speed regulation rate ($\delta_r$) based on the measured rotor speed and the measured output of the power generator, and for setting a reference speed regulation rate ($\delta_{ref}$) based on the actual speed regulation rate and the target speed regulation rate ($\delta_t$); and a fuel amount control unit for controlling an amount of fuel supplied to the combustor based on the set reference speed regulation rate.

The fuel amount control unit may control the amount of fuel supplied to the combustor, by determining the output to be produced in the power generator based on the measured rotor speed and the set reference speed regulation rate. The fuel amount control unit may determine the output to be produced in the power generator according to an Equation 3.

The sensing unit may measures the rotor speed and the output of the power generator by cumulatively averaging measured values during a predetermined time period, and the speed regulation rate setting unit may periodically set the reference speed regulation rate according to the predetermined time period. The speed regulation rate setting unit may calculate the actual speed regulation rate ($\delta_r$) according to an Equation 4.

The speed regulation rate setting unit may set the reference speed regulation rate so that the difference between the output of the power generator obtained by the reference speed regulation rate ($\delta_{ref}$) and the output of the power generator obtained by the reference speed regulation rate ($\delta_{oref}$) during a previous period matches with the difference between the output of the power generator obtained by the target speed regulation rate ($\delta_t$) and the output of the power generator obtained by the actual speed regulation rate ($\delta_r$). The speed regulation rate setting unit may calculate the output of the power generator according to $$P_c = P_o + \frac{P_N}{A} \times \frac{N_o - N_c}{N_N}$$

where $N_N$ denotes a rated rotor speed of the turbine, $N_o$ denotes the rotor speed of the turbine during a previous period, $N_c$ denotes a current rotor speed, $P_N$ denotes a rated output of the power generator, $P_o$ denotes the output of the power generator at the previous reference speed regulation rate, and A denotes one of $\delta_{ref}$, $\delta_{oref}$, $\delta_t$, and $\delta_r$. The speed regulation rate setting unit may then set the reference speed regulation rate according to an Equation 5.

In accordance with another aspect of the present invention, a gas turbine system for power generation may include a compressor for sucking and compressing external air; a combustor for combusting fuel and the air compressed in the compressor to generate a high-temperature, high-pressure combustion gas; a turbine having a rotor rotated by the combustion gas; a power generator configured to driven by the rotation of the rotor; and the above control device to control the amount of fuel supplied to the combustor.

In accordance with another aspect of the present invention, a method of controlling a gas turbine system as above may include steps of setting a target speed regulation rate ($\delta_t$); measuring the rotor speed and the output of the power generator; calculating an actual speed regulation rate ($\delta_r$) based on the measured rotor speed and the measured output of the power generator; setting a reference speed regulation rate ($\delta_{ref}$) based on the actual speed regulation rate and the target speed regulation rate; and controlling an amount of fuel supplied to the combustor depending on the set reference speed regulation rate.

In accordance with the present invention, there is the effect that, when additional power should be supplied due to a sudden change in load or the failure of other power plants, stable operation of the entire system can be secured by controlling the gas turbine system in order to satisfy the target speed regulation rate.

Furthermore, in accordance with the present invention, there is the effect that a speed regulation rate required by a business operator can be met by eliminating instances where the actual speed regulation rate is lower than the target speed regulation rate due to influences such as a delay in the response time of the system.

BRIEF DESCRIPTION OF THE DRAWINGS

FIG. 1 is a block diagram illustrating a gas turbine system in accordance with one embodiment of the present invention;

FIG. 2 is a graph of power generator output versus system frequency, for two different speed regulation rates;

FIG. 3 is a block diagram of the control device of FIG. 1; and

FIG. 4 is a flowchart illustrating a method of controlling a gas turbine system in accordance with one embodiment of the present invention.

DESCRIPTION OF SPECIFIC EMBODIMENTS

Descriptions of irrelevant components are omitted so as to clearly describe the exemplary embodiments of the present invention, and throughout this specification, the same or like elements are denoted by the same reference numerals.

Throughout this specification, it will be understood that when an element is referred to as being "connected" to another element, it can be "directly connected" to the other element or "electrically connected" to the other element with other elements interposed therebetween. It will be further understood that when an element is referred to as "comprises" another element, the element is intended not to exclude one or more other elements, but to further include one or more other elements, unless the context clearly indicates otherwise.

When it is described that any one part is "on" the other part, it may mean that the part is directly on the other part or any other part is interposed therebetween. On the contrary, when it is described that any one part is "directly on" the other part, there is no other part interposed therebetween.

The terms "first," "second," "third" and the like are used to illustrate various parts, components, areas, layers and/or sections, but are not limited thereto. The terms are only used to differentiate a certain part, component, area, layer or section from other part, component, area, layer or section. Accordingly, a first part, component, area, layer or section, which will be mentioned hereinafter, may be referred to as a second part, component, area, layer or section without departing from the scope of the present invention.

The terminology used herein is for the purpose of describing particular embodiments only and is not intended to limit the present invention. The singular forms used herein are intended to include the plural forms as well, unless the context clearly indicates otherwise. It will be further understood that the terms "comprises" and/or "comprising," or "includes" and/or "including" used in this specification, specify the presence of stated features, regions, integers, steps, operations, elements, and/or components, but do not preclude the presence or addition of other features, regions, integers, steps, operations, elements, and/or components.

Terms "below", "above", and the like indicating a relative space may be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts may be described as being "above" the other parts. Therefore, the exemplary term "below" includes both of an upper direction and a lower direction. The device may rotate by 90° or other angles, and the terms indicating a relative space are interpreted according thereto.

Unless otherwise defined, all terms (including technical and scientific terms) used herein have the same meaning as commonly understood by one of ordinary skill in the art to which the present invention pertains. The terms defined in commonly used dictionaries, should be additionally interpreted as having a meaning that is consistent with the context of the relevant art and the present invention, and will not be interpreted in an idealized or overly formal sense unless expressly so defined herein.

Hereinafter, exemplary embodiments of the present invention will be described in detail with reference to the accompanying drawings so that those skilled in the art may easily practice the present invention. The present invention may be implemented in various different forms, and is not limited to the exemplary embodiments described herein.

FIG. 1 illustrates a gas turbine system in accordance with one embodiment of the present invention.

Referring to FIG. 1, the gas turbine system may include a compressor 10, a turbine 20, a combustor 30, a shaft 40, a power generator 50, and a control apparatus 100.

The compressor 10 may perform a function of producing high-pressure compressed air by sucking and compressing external air. The compressed air may be transferred to the combustor 30.

The combustor 30 may inject fuel into the compressed air transferred from the compressor 10 and combust the fuel-air mixture to generate high-pressure, high-temperature combustion gas for output to the turbine 20. The high-pressure, high-temperature combustion gas supplied to the turbine 20 rotates rotor blades of the turbine, thereby rotating a rotor of the turbine 20. The temperature and pressure of the combustion gas supplied to the turbine 20 are lowered while the combustion gas drives the rotor blades of the turbine. Then, the combustion gas is discharged as exhaust gas to the atmosphere.

Since the turbine 20 and the compressor 10 are fixed to one shaft 40, while the rotor of the turbine 20 is rotated as described above, the compressor 10 is also rotated to compress air.

The power generator 50 may generate power using the rotation of the rotor of the turbine 20.

The control device 100 can generally perform various controls for efficient driving of the gas turbine system.

In the gas turbine system as described above, a method for regulating the rotational speed of the rotor of the turbine 20 may be divided into a load limit control method and a governor free control method. The load limit control method refers to a method that fixes the rotational speed of the rotor of the turbine 20 at a constant speed, and the governor free control method refers to a method that automatically controls the rotational speed of the rotor of the turbine 20 according to a frequency change of a power system. In general, a system frequency for stable operation of the entire power system needs to be retained at the rated frequency (60 Hz in the case of Korea). Therefore, in consideration of facility protection, operators of gas turbine systems prefer the load limit control method, which can prevent a sudden fluctuation of the gas turbine system. However, the "power market operation rule" applicable to power generation companies, as set by the Korea Power Exchange that oversees stable operations of the country's entire power system, obliges member companies to "actively cooperate to retain the system frequency through governor free operation." Thus, gas turbine systems are generally operated according to the governor free control method.

When the gas turbine system is operated according to the governor free control method, the rotor of the turbine 20 is rotated at a rotation speed proportional to the system frequency. At this time, the concept of speed regulation (or droop control) rate may be introduced. The speed regulation rate refers to a percentage ratio of a frequency change rate (a change rate of the rotor rotation speed of the turbine 20) to a change rate of the power of the power generator 80. For example, assuming that power plants A through K supply power to the power system, when power plant K stops supplying power due to a breakdown or similar event, the amount of the power generation may fall short. Then, the system frequency may be lowered by an imbalance between the amount of the power generation and a load. In this case, the power plants A through J need to properly share the shortage of the power generation, and additionally generate power to rapidly recover the system frequency. At this time, each of the plants tries to additionally generate power according to the given speed regulation rate.

Generally, the speed regulation rate (δ) is expressed as Equation 1 below.

$$\delta = \left(\frac{N_1 - N_2}{N_N}\right) \times \left(\frac{P_N}{P_2 - P_1}\right) \times 100 \qquad \text{[Equation 1]}$$

And, from Equation 1, the following Equation 2 can be obtained.

$$P_2 = P_1 + \frac{P_N}{\delta} \frac{N_1 - N_2}{N_N} \times 100 \qquad \text{[Equation 2]}$$

In Equation 2, $N_1$, $N_2$ and $N_N$ are rotor speed values (expressed in revolutions per minute, or rpm) of the turbine 20, and $P_1$, $P_2$ and $P_N$ are power values of the power generator 80. More specifically, $N_1$ denotes the immediately previous rotor speed, $N_2$ denotes the current rotor speed, $N_N$ denotes the rated rotor speed, $P_1$ denotes the previous power of the power generator 80, $P_2$ denotes a power that the power generator should generate when the rotor speed changes from $N_1$ to $N_2$, and $P_N$ denotes the rated power.

For example, the system frequency may undergo a sudden drop from the rated frequency due to an event occurring in the system, and arbitrary values associated with the event may be a speed regulation rate δ of 3%, a rated power $P_N$ of 28.8 MW, a previous power $P_1$ of 21.6 MW, and a system frequency drop to 59.7 Hz from a rated frequency of 60 Hz. Further, since the rotor speed is proportional to the system frequency, $N_1$ and $N_N$ may each be assumed as 60$k$ ($N_1=N_N=60$ k) and $N_2$ as 59.7 k ($N_2=59.7$ k). Then, the power generator 80 should generate a power $P_2$ of 26.4 MW in order to restore the system frequency to the rated frequency.

FIG. 2 shows two outputs (210, 220) of the power generator 50 depending on the system frequency, at two different speed regulation rates, respectively. That is, a line 220 represents the case that the speed regulation rate is 2%, and a line 210 represents the case that the speed regulation rate is 4%.

Referring to FIG. 2, if the system frequency is the rated frequency, the power generator produces an output P. Meanwhile, if the system frequency drops below the rated frequency, the output to be produced depending on the speed regulation rate should be increased, and if the system frequency exceeds the rated frequency, the output to be produced depending on the speed regulation rate should be decreased. Therefore, for a speed regulation rate of 2%, the power generator should produce 1.5 times the output (P) at the rated frequency when the rate of change of the frequency has changed by 1% (0.6 Hz), and for a speed regulation rate of 4%, the power generator should produce 1.5 times the output (P) at the rated frequency when the rate of change of the frequency has changed by 2% (1.2 Hz). That is, it can be seen that the output to be produced should be changed more sharply for lower speed regulation rates.

In this case, in order to increase the output depending on the speed regulation rate, the amount of fuel supplied to the combustor 30 should be increased to generate more high-temperature, high-pressure combustion gas.

The control device 100 of the present invention can control the amount of fuel supplied to the combustor 30 in order to meet the above-described target speed regulation rate. In addition, the amount of compressed air supplied from the compressor 10 to the combustor 30 can be also controlled. Other control elements on other gas turbine systems can be also controlled.

However, there are problems in determining whether the speed regulation rate obtained by an actual control by the control device 100 matches the target speed regulation rate required by the system manager. That is, although it may be known, through simulations, that the amount of fuel to be supplied should be increased by a few percentage points in order for the power generator 50 to produce the necessary output for the target speed regulation rate, and although the known fuel amount may be injected, it cannot be seen whether the obtained speed regulation rate after the fuel injection matches the target speed regulation rate. Observation of the obtained speed regulation rate is hindered by changes in the response time of the system being controlled, the system's current status, fuel quality, environmental factors, etc.

Accordingly, in the present invention, the control device 100 is designed to adaptively achieve the target speed regulation rate.

FIG. 3 shows the control device 100 in accordance with one embodiment of the present invention.

Referring to FIG. 3, the control device 100 may include a sensing unit 110, a speed regulation rate setting unit 120, and a fuel amount control unit 130.

The sensing unit 110 may measure the rotor speed of the turbine 20 and the output of the power generator 50. As described above, since the rotor speed of the turbine 20 is proportional to the system frequency, the change of the system frequency may be recognized by measuring the rotor speed of the turbine 20, specifically, by counting the revolutions per minute achieved by the turbine rotor.

The fuel amount control unit 130 may determine the output to be produced in the power generator 50 based on a reference speed regulation rate (to be described later) that is set in the speed regulation rate setting unit 120 and the rotor speed of the turbine 20 that is measured in the sensing unit 110. The fuel amount control unit 130 may then control the gas turbine system in order for the power generator 50 to produce the determined output. Particularly, the amount of fuel supplied to the combustor 30 can be controlled. That is, if a higher output should be produced in the power generator 50, the gas turbine system can be controlled so that more fuel is supplied to the combustor 30, and if a lower output should be produced, the gas turbine system can be controlled so that less fuel is supplied to the combustor 30. Here, the output ($P_c$) to be produced in the power generator 50 can be obtained by the following Equation 3.

$$P_c = P_o + \frac{P_N}{\delta_{ref}} \times \frac{N_o - N_c}{N_N} \qquad \text{[Equation 3]}$$

In Equation 3, $N_N$ denotes the rated rotor speed of the turbine 20, $N_o$ denotes the rotor speed at the previous reference speed regulation rate, $N_c$ denotes the current rotor speed, $P_N$ denotes the rated output of the power generator 50, $P_o$ denotes the power generator output at the previous reference speed regulation rate, and $\delta_{ref}$ denotes a reference speed regulation rate that is newly set.

The speed regulation rate setting unit 120 can set a reference speed regulation rate ($\delta_{ref}$) that is referenced for determining the amount of fuel to be supplied to the combustor 30 from the fuel amount control unit 130. Simply, a target speed regulation rate ($\delta_t$) can be set as the reference speed regulation rate ($\delta_{ref}$), but as described above, it is possible that an actual speed regulation rate ($\delta_r$) does not match the target speed regulation rate ($\delta_t$) due to various reasons. To address this, the reference speed regulation rate ($\delta_{ref}$) can be again set based on the actual speed regulation rate ($\delta_r$). The actual speed regulation rate ($\delta_r$) can be obtained from the following Equation 4.

$$\delta_r = \left(\frac{N_o - N_c}{N_N}\right) \times \left(\frac{P_N}{P_c - P_o}\right) \times 100 \qquad \text{[Equation 4]}$$

In Equation 4, $N_N$ denotes the rated rotor speed; $N_o$ denotes the immediately preceding rotor speed, $N_c$ denotes the current rotor speed; $P_N$ denotes the rated output, i.e., the maximum power of the power generator 50; $P_o$ denotes the power generator output for a rotor speed of $N_o$; and $P_c$ denotes the power generator output for a rotor speed of $N_c$. In this case, rotor speed and output power may be accumulative averages over time. That is, the actual speed regulation rate ($\delta_r$) is not calculated based on instantaneous measurement results, and may instead be calculated based on results accumulated and measured during a predetermined time period.

In an embodiment assuming $N_N=N_o=60$ k, $N_c=59.7$ k, $P_N=28.8$ MW, $P_o=21.6$ MW, and $P_c=26.4$ MW, the actual speed regulation rate ($\delta_r$) is 3% by Equation 4. Thus, if the target speed regulation rate ($\delta_t$) is 3%, the actual rate matches the target rate, so that the reference speed regulation rate ($\delta_{ref}$) that is currently set is maintained. However, if the actual speed regulation rate ($\delta_r$) differs from the target speed regulation rate ($\delta_t$), the reference speed regulation rate ($\delta_{ref}$) needs to be modified in order to match the target speed regulation rate.

In the assumed embodiment above, if the power generator 50 produces $P_2=25.2$ MW, the actual speed regulation rate ($\delta_r$) becomes 4% and does not satisfy the target speed regulation rate ($\delta_t$) of 3%. To solve the problem, the speed regulation rate setting unit 120 can set the reference speed regulation rate ($\delta_{ref}$) to a rate lower than the present rate.

For this purpose, the speed regulation rate setting unit 120 can calculate the actual speed regulation rate ($\delta_r$) using Equation 4 based on the output ($P_2$) produced by the power generator 50, and can obtain a new reference speed regulation rate ($\delta_{ref}$) based on the target speed regulation rate ($\delta_t$) using the following Equation 5.

$$\delta_{ref} = \frac{\delta_{oref} \times \delta_t \times \delta_r}{\delta_t \times (\delta_r + \delta_{oref}) \times (\delta_r - \delta_{oref}) \times \delta_t} \qquad \text{[Equation 5]}$$

Equation 5 illustrates one example that sets a new reference speed regulation rate ($\delta_{ref}$). Here, the output of the power generator 50 is obtained using Equation 3, and the difference between the output of the power generator 50 obtained by the new reference speed regulation rate ($\delta_{ref}$) and that obtained by the previous reference speed regulation rate ($\delta_{oref}$) matches the difference between the output obtained by the target speed regulation rate ($\delta_t$) and that obtained by the actual speed regulation rate ($\delta_r$).

FIG. 4 illustrates a method of controlling to set the reference speed regulation rate and to match the target speed regulation rate in the control device 100 in accordance with one embodiment of the present invention.

Referring to FIG. 4, the control device 100 in accordance with one embodiment of the present invention may firstly set the target speed regulation rate for the gas turbine system in order for the gas turbine system to operate to meet the target speed regulation rate (S510). Then, the rotor speed of the turbine 20 and the output of the power generator 50 may be measured (S520). At this time, with the gas turbine system operating to meet the target speed regulation rate, the system frequency can be determined based on the rotor speed the turbine 20. If the system frequency is the rated frequency, the control by the speed regulation rate is not required, in which case the output of the power generator 50 at the rated frequency can be measured and stored.

If the system frequency as calculated by the rotor speed of the turbine 20 is not the rated frequency, the output of the power generator 50 should be increased or decreased depending on the target speed regulation rate. For this purpose, the control device 100 can set the reference speed regulation rate ($\delta_{ref}$) that is referenced in order for the fuel amount control unit 130 to control the amount of fuel. The initial reference speed regulation rate ($\delta_{ref}$) may be set to be identical to the target speed regulation rate ($\delta_t$), and the actual speed regulation rate ($\delta_r$) may be calculated based on the rotor speed of the turbine 20 and the output of the power generator 50 accumulated and measured during a predetermined time period (S530). If the calculated actual speed regulation rate ($\delta_r$) does not satisfy the target speed regulation rate ($\delta_t$), a new reference speed regulation rate ($\delta_{ref}$) can be set (S540), and the fuel amount control unit 130 can control the amount of fuel supplied to the combustor depending on the reference speed regulation rate ($\delta_{ref}$) that is newly set (S550). The speed regulation rate setting unit 120 of the control device 100 can repetitively perform the steps S520 to S540, periodically, until the target speed regulation rate ($\delta_t$) is satisfied.

In accordance with the above-described method, the speed regulation rate setting unit 120 can periodically set the reference speed regulation rate ($\delta_{ref}$), so that the gas turbine system can be controlled to regulate the target speed regulation rate ($\delta_t$). In an embodiment for setting the new reference speed regulation rate ($\delta_{ref}$), the output of the power generator 50 is obtained using Equation 3, and the new reference speed regulation rate is set so that the difference between the relative outputs of the power generator 50, as obtained by the new reference speed regulation rate and by the previous reference speed regulation rate, matches the difference obtained by the target rate and the actual rate.

As described above, the control device proposed in the present invention can provide the effect that the reference speed regulation rate can be set based on the actual speed regulation rate and the amount of fuel can be adjusted based on the reference speed regulation rate, thus achieving the target speed regulation rate in the gas turbine system.

Those skilled in the art to which the present invention pertains should be understood that the present invention may be implemented in other various forms without departing from the technical spirit or essential characteristics of the present invention, so the aforementioned embodiments should not be construed as being limitative, but should be construed as being only illustrative from all aspects. The scope of the present invention is disclosed in the appended claims rather than the detailed description, and it should be understood that all modifications or variations derived from the meanings and scope of the present invention and equivalents thereof are included in the scope of the appended claims.

What is claimed is:

1. A gas turbine control device for a gas turbine system which comprises a compressor sucking and compressing external air; a combustor combusting fuel and the air compressed in the compressor to generate a high-temperature, high-pressure combustion gas; a turbine having a rotor rotated by the combustion gas, the rotor having a rotor speed proportional to a system frequency; and a power generator driven by the rotation of the rotor, an output of the power generator being adjusted depending on a target speed regulation rate in order to restore the system frequency to a rated frequency, the device comprising:
a sensing unit for measuring the rotor speed and the output of the power generator;
a speed regulation rate setting unit for calculating an actual speed regulation rate ($\delta_r$) based on the measured rotor speed and the measured output of the power generator, and for setting a reference speed regulation rate ($\delta_{ref}$) based on the actual speed regulation rate and the target speed regulation rate ($\delta_t$); and
a fuel amount control unit for controlling an amount of fuel supplied to the combustor based on the set reference speed regulation rate.

2. The gas turbine control device of claim 1, wherein the fuel amount control unit controls the amount of fuel supplied to the combustor, by determining the output to be produced in the power generator based on the measured rotor speed and the set reference speed regulation rate.

3. The gas turbine control device of claim 2, wherein the fuel amount control unit determines the output to be produced in the power generator according to $$P_c = P_o + \frac{P_N}{\delta_{ref}} \times \frac{N_o - N_c}{N_N}$$

where $N_N$ denotes a rated rotor speed of the turbine, $N_o$ denotes the rotor speed at a previous reference speed regulation rate, $N_c$ denotes a current rotor speed, $P_N$ denotes a rated output of the power generator, $P_o$ denotes the power generator output at the previous reference speed regulation rate, and $\delta_{ref}$ denotes the set reference speed regulation rate.

4. The gas turbine control device of claim 1, wherein the sensing unit measures the rotor speed and the output of the power generator by cumulatively averaging measured values during a predetermined time period, and
wherein the speed regulation rate setting unit periodically sets the reference speed regulation rate according to the predetermined time period.

5. The gas turbine control device of claim 4, wherein the speed regulation rate setting unit calculates the actual speed regulation rate ($\delta_r$) according to $$\delta_r = \left(\frac{N_o - N_c}{N_N}\right) \times \left(\frac{P_N}{P_c - P_o}\right) \times 100$$

where $N_N$ denotes a rated rotor speed of the turbine, $N_o$ denotes the rotor speed of the turbine during a previous period, $N_c$ denotes a current rotor speed, $P_N$ denotes a rated output that is a maximum output of the power generator, $P_o$ denotes the output of the power generator for a rotor speed of $N_o$, and $P_c$ denotes the output of the power generator for a rotor speed of $N_c$.

6. The gas turbine control device of claim 1, wherein the speed regulation rate setting unit sets the reference speed regulation rate so that the difference between the output of the power generator obtained by the reference speed regulation rate ($\delta_{ref}$) and the output of the power generator obtained by the reference speed regulation rate ($\delta_{oref}$) during a previous period matches with the difference between the output of the power generator obtained by the target speed regulation rate ($\delta_t$) and the output of the power generator obtained by the actual speed regulation rate ($\delta_r$).

7. The gas turbine control device of claim 6, wherein the speed regulation rate setting unit calculates the output of the power generator according to $$P_c = P_o + \frac{P_N}{A} \times \frac{N_o - N_c}{N_N}$$

where $N_N$ denotes a rated rotor speed of the turbine, $N_o$ denotes the rotor speed of the turbine during a previous period, $N_c$ denotes a current rotor speed, $P_N$ denotes a rated output of the power generator, $P_o$ denotes the output of the power generator at the previous reference speed regulation rate, and A denotes one of $\delta_{ref}$, $\delta_{oref}$, $\delta_t$, and $\delta_r$.

8. The gas turbine control device of claim 6, wherein the speed regulation rate setting unit sets the reference speed regulation rate according to $$\delta_{ref} = \frac{\delta_{oref} \times \delta_t \times \delta_r}{\delta_t \times (\delta_r + \delta_{oref}) \times (\delta_r - \delta_{ref}) \times \delta_t}.$$

9. A gas turbine system for power generation, comprising:
a compressor for sucking and compressing external air;
a combustor for combusting fuel and the air compressed in the compressor to generate a high-temperature, high-pressure combustion gas;
a turbine having a rotor rotated by the combustion gas;
a power generator configured to driven by the rotation of the rotor; and
the control device configured to control the amount of fuel supplied to the combustor.

10. A method of controlling a gas turbine system which comprises a compressor sucking and compressing external air; a combustor combusting fuel and the air compressed in the compressor to generate a high-temperature, high-pressure combustion gas; a turbine having a rotor rotated by the combustion gas, the rotor having a rotor speed proportional to a system frequency; and a power generator driven by the rotation of the rotor, an output of the power generator being adjusted depending on a target speed regulation rate in order to restore the system frequency to a rated frequency, the method comprising:
setting a target speed regulation rate ($\delta_t$);
measuring the rotor speed and the output of the power generator;
calculating an actual speed regulation rate ($\delta_r$) based on the measured rotor speed and the measured output of the power generator;
setting a reference speed regulation rate ($\delta_{ref}$) based on the actual speed regulation rate and the target speed regulation rate; and
controlling an amount of fuel supplied to the combustor depending on the set reference speed regulation rate.

11. The method of controlling the gas turbine of claim 10, wherein the controlling comprises:
determining the output to be produced in the power generator based on the measured rotor speed and the set reference speed regulation rate.

12. The method of controlling the gas turbine of claim 11, wherein the output to be produced in the power generator is determined according to $$P_c = P_o + \frac{P_N}{\delta_{ref}} \times \frac{N_o - N_c}{N_N}$$

where $N_N$ denotes a rated rotor speed of the turbine, $N_o$ denotes the rotor speed at a previous reference speed regulation rate, $N_c$ denotes a current rotor speed, $P_N$ denotes a rated output of the power generator, $P_o$ denotes the power generator output at the previous reference speed regulation rate, and $\delta_{ref}$ denotes the set reference speed regulation rate.

13. The method of controlling the gas turbine of claim 10, wherein the measuring comprises cumulatively averaging measured values during a predetermined time period, and
wherein the reference speed regulation rate setting is repeated periodically according to the predetermined time period.

14. The method of controlling the gas turbine of claim 13, wherein the actual speed regulation rate ($\delta_r$) is calculated according to $$\delta_r = \left(\frac{N_o - N_c}{N_N}\right) \times \left(\frac{P_N}{P_c - P_o}\right) \times 100$$

where $N_N$ denotes a rated rotor speed of the turbine, $N_o$ denotes the rotor speed of the turbine during a previous period, $N_c$ denotes a current rotor speed, $P_N$ denotes a rated output that is a maximum output of the power generator, $P_o$ denotes the output of the power generator for a rotor speed of $N_o$, and $P_c$ denotes the output of the power generator for a rotor speed of $N_c$.

15. The method of controlling the gas turbine of claim 10, wherein the reference speed regulation rate setting comprises:
setting the reference speed regulation rate so that the difference between the output of the power generator obtained by the reference speed regulation rate ($\delta_{ref}$) and the output of the power generator obtained by the reference speed regulation rate ($\delta_{oref}$) during a previous period matches with the difference between the output of the power generator obtained by the target speed regulation rate ($\delta_t$) and the output of the power generator obtained by the actual speed regulation rate ($\delta_r$).

16. The method of controlling the gas turbine of claim 15, wherein the calculating comprises calculating the output of the power generator according to $$P_c = P_o + \frac{P_N}{A} \times \frac{N_o - N_c}{N_N}$$

where $N_N$ denotes a rated rotor speed of the turbine, $N_o$ denotes the rotor speed of the turbine during a previous period, $N_c$ denotes a current rotor speed, $P_N$ denotes a rated output of the power generator, $P_o$ denotes the output of the power generator at the previous reference speed regulation rate, and A denotes one of $\delta_{ref}$, $\delta_{oref}$, $\delta_t$, and $\delta_r$.

17. The method of controlling the gas turbine of claim 15, wherein the reference speed regulation rate setting comprises setting the reference speed regulation rate according to $$\delta_{ref} = \frac{\delta_{oref} \times \delta_t \times \delta_r}{\delta_t \times (\delta_r + \delta_{oref}) \times (\delta_r - \delta_{ref}) \times \delta_t}.$$

* * * * *